United States Patent

Gauffin et al.

[11] Patent Number: 5,517,499
[45] Date of Patent: May 14, 1996

[54] METHOD AND AN ARRANGEMENT FOR SYNCHRONIZING TWO OR MORE COMMUNICATION NETWORKS OF THE TIME MULTIPLEX TYPE

[75] Inventors: Lara Gauffin, Ronnings; Christer Bohm, Stockholm; Lara Hakansson, Taby; Per Lindgren, Stockholm, all of Sweden

[73] Assignee: Telefonaktiebolaget LM Ericsson, Stockholm, Sweden

[21] Appl. No.: 217,020

[22] Filed: Mar. 24, 1994

Related U.S. Application Data

[63] Continuation of Ser. No. 889,358, May 28, 1992, abandoned.

[51] Int. Cl.[6] .................................................. H04L 7/04
[52] U.S. Cl. ............................ 370/84; 370/101; 375/356
[58] Field of Search .................... 370/94.1, 84, 105.1, 370/105.4, 101, 85.1, 102, 94.3, 85.13, 85.14, 85.15, 100.1; 375/354, 356

[56] References Cited

U.S. PATENT DOCUMENTS

| | | | |
|---|---|---|---|
| 4,471,481 | 9/1984 | Shaw et al. | 370/101 |
| 4,516,237 | 5/1985 | Perry et al. | 370/58.3 |
| 4,564,937 | 1/1986 | Perry et al. | 370/58.1 |
| 4,606,044 | 8/1986 | Kudo | 370/84 |
| 4,660,195 | 4/1987 | Hatabe | 370/101 |
| 4,808,008 | 2/1989 | Gverillot | 370/84 |
| 5,001,707 | 3/1991 | Kositpaiboon et al. | 370/94.1 |
| 5,018,137 | 5/1991 | Backes et al. | 370/85.14 |
| 5,018,171 | 5/1991 | Perloff et al. | 370/85.5 |
| 5,020,057 | 5/1991 | Taniguchi et al. | 370/105.1 |
| 5,241,543 | 8/1993 | Amada et al. | 370/102 |

FOREIGN PATENT DOCUMENTS

| | | |
|---|---|---|
| 0374883 | 6/1990 | European Pat. Off. . |
| 0409539 | 1/1991 | European Pat. Off. . |
| 2230679 | 10/1990 | United Kingdom . |

OTHER PUBLICATIONS

L. Gauffin et al. "Multi–Gigabit Networking Based on PTM" *1st MultiG Workshop*, Stockholm (Nov. 1, 1990).

*Primary Examiner*—Wellington Chin
*Assistant Examiner*—Chau T. Nguyen
*Attorney, Agent, or Firm*—Burns, Doane, Swecker & Mathis

[57] ABSTRACT

A method and an arrangement for synchronizing two more individual communication networks of the time multiplex type, in order to form a composite network thereof, wherein the individual networks having nodes, in which cyclic transmission of time frames is performed, which include time slots intended for the data transmission. One node in the composite network is assigned the role as a superior master node determining the transmission speed of the individual communication networks. This is obtained by adding a fixed idle pattern to each time frame set out from the superior master node, followed by a fixed triggering pattern as a start of the next time frame. At the receipt of the triggering pattern at a master node in an individual communication network, which synchronizes the data transmission of the communication network, the master node starts sending a new time frame.

4 Claims, 3 Drawing Sheets

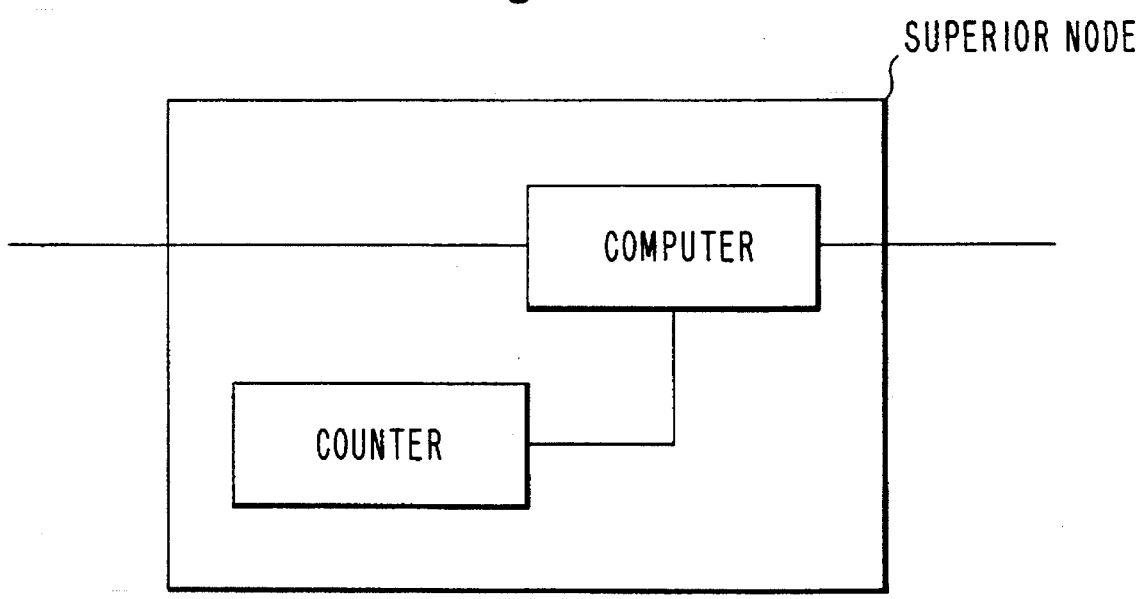

METHOD AND AN ARRANGEMENT FOR SYNCHRONIZING TWO OR MORE COMMUNICATION NETWORKS OF THE TIME MULTIPLEX TYPE

This application is a continuation, of application Ser. No. 07/889,358, filed May 28, 1992 abandoned.

TECHNICAL AREA

The present invention relates to a method and an arrangement for synchronizing two or more individual communication networks of the time multiplex type, in order to form a composite network thereof, said individual communication networks having nodes via which cyclic transmission of time frames is performed, said time frames including time slots intended for data transmission.

PRIOR ART

In a very fast network with a multidimensional topology, i.e. a network composed of several individual communication networks, a total synchronization is difficult to obtain. The frame repetition frequency must be the same over the whole network, but the individual communication networks can work with different clock and data rates. When the data transmission reaches a rate of an order of magnitude of Gigabit/s the amount of data in a node can grow very fast if the node connects data between two communication networks and the supply of data from one of the networks is faster than the output of data on the other network. As a result buffering problems can occur in such a node.

DESCRIPTION OF THE INVENTION

The object of the invention is to eliminate disadvantages of the kind indicated above in very fast networks with a multidimensional topology.

The invention is based upon the realization that this object can be attained, surprisingly enough, by eliminating the need of phase synchronization between the different communication networks, and more particularly by determining, in the method according to the invention, the transmission rate of the individual communication networks by forming a fixed idle pattern, common to the composite network, and a fixed triggering pattern, and adding said idle pattern to each time frame sent from a node, followed by said triggering pattern as a means for indicating a start for transmitting a next time frame.

The arrangement according to the invention is characterized by one node of the composite network being assigned the role as a superior master node which, for determining the transmission rate of the individual communication networks includes means for forming a fixed idle pattern, common to the composite network, and a fixed triggering pattern, and means for adding said idle pattern to each time frame transmitted from said superior master node, followed by said fixed triggering pattern as a start of next time frame, one node of each of said individual networks being assigned the role as a master node for synchronizing the data transmission of the respective network, said master node including means for starting, at the receipt of the triggering pattern in therein, transmission of a new time frame from this master node.

Thus, one node in the composite network is assigned the role as a superior master node determining the transmission speed of the individual communication networks. This is obtained by adding a fixed idle pattern to each time frame sent out from the node, followed by a fixed triggering pattern as a start of the next time frame. At the receipt of the triggering pattern in a master node in an individual communication network, which synchronizes the data transmission of this communication network, the master node starts sending a new time frame.

For maintaining the phase or bit synchronization in an individual communication network, the first node is chosen to be a master. The master node continuously sends out data or a clock pattern. Node number two receives data or a clock pattern so that the PLL (Phase Locked Loop) thereof is locked to the master clock. The clock of the second node will be locked to the master clock at the transmission of data to the other nodes on the bus. In the same way the other nodes will lock their PLL:s to the up-stream PLL.

The superior master determines the transmission speed in the whole composite network. Each individual network therein is locked to this speed for sending out time frames. This is carried through by the superior master starting each frame with the triggering pattern. This pattern is recognized and forwarded by all other nodes down-stream in the network. If one node is master in another network it starts a new frame therein. When a master has stopped sending a frame it waits until it receives the triggering pattern anew before it starts sending a new frame.

DESCRIPTION OF THE DRAWINGS

The invention will now be described more closely with reference to the drawings, on which FIG. 1 schematically, as an example, shows a smaller section of a network composed by several communication networks.

FIG. 6 illustrates a superior master node according to one embodiment of the present invention.

PREFERRED EMBODIMENTS

Figure 1:
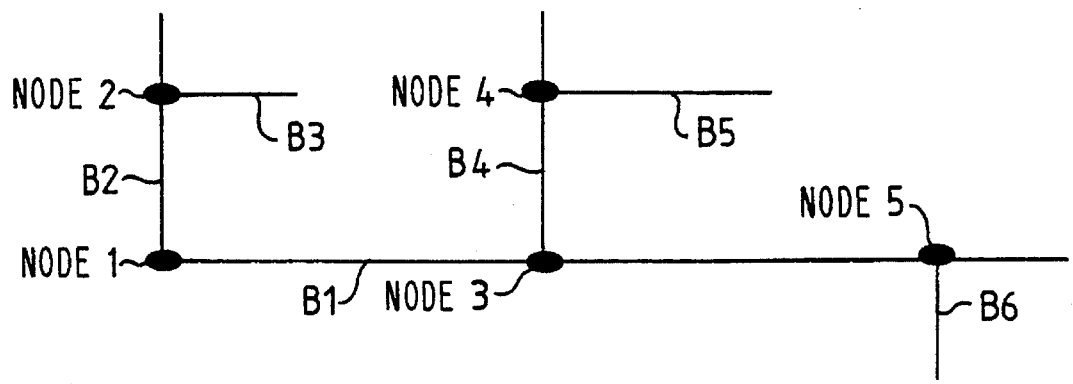

With reference to FIG. 1 a composite network is made up of individual communication networks of the time multiplex type. More particularly, these communication networks are exemplified by six buses B1–B6 containing five nodes N1–N5. The nodes N2–N5 are the starting node on each one of the respective buses B3–B6. From the node N1 buses B1 and B2 start. The nodes N3 and N5 are located on the bus B1, the node N2 on the bus B2, and the node N4 on the bus B4.

Each one of the nodes N2–N5 by virtue of its location at the beginning of a bus, has been assigned the role as a master node controlling the frame synchronization on this bus. The node N1 by virtue of its location at the beginning of all buses has been assigned the role as a superior master node controlling the synchronization of the master nodes of these buses.

Although not shown, the buses of the net, of course, include other nodes than master nodes.

Figure 2:
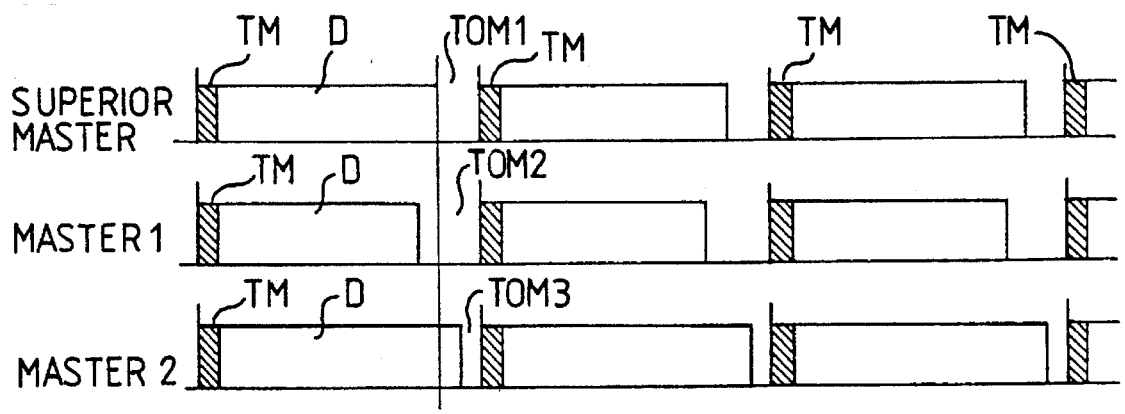
FIG. 2 is a comparative assembly of three time frame sequences appearing in a composite network according to the invention, viz. from a superior master node, a master node in a fast part-network, and a master node in a slow part-network, respectively, FIG. 3 in a similar assembly as in FIG. 2 illustrates the action of propagation delay on the frame sequences according to FIG. 2, FIG. 4 schematically shows the topology of a network occuring in practice, in which the invention can be used.

The data transmission is divided into time frames, schematically illustrated in FIG. 2. The overall cycle time includes, in turn from the beginning of the frame, a fixed triggering pattern TM, data D in a time slots not shown, and a fixed idle pattern TOM.

The idle pattern TOM is stored in the computer of the superior master node, as illustrated in FIG. 6 and is added by the latter to the time frame as a reaction to a time slot counter included in this node having finished counting. This can e.g. be done, in a way easily realized by the man of the art, by assigning to the time frame an extra time slot obtaining the idle pattern. To the idle pattern a new fixed triggering pattern TM is added as the start of the next time frame.

Each frame is thus started by a triggering pattern TM. This pattern is created and distributed by the master nodes over the buses, such as B1–B6. Nodes down-stream detect the pattern and synchronize their logic for a new frame. It does not matter if the data transmission time is not the same on different buses, but the total cycle time has to be the same.

The superior master node N1 starts its frame with the triggering pattern. When this pattern reaches a master node, i.e. one of the nodes N2–N5, this node knows that a new time frame has begun. The master node then starts the frame on its bus, i.e. the respective one of the buses B3–B6, by transmitting a triggering pattern down-stream. For obtaining synchronization without the masters beginning to "slip" with respect to each other, each cycle is ended by the idle pattern.

The idle pattern makes possible obtaining cycle synchronization without having complete clock synchronization between the part-networks B1–B6. If the clocks of the master nodes do not work with the same speed the difference is absorbed by the idle pattern. If the clock of one master node is very fast the node has to wait until it receives the trigging pattern before being able to start sending on its bus/buses. On the other hand, if its clock is slow it has the idle time at its disposition for completing its transmission until it receives the triggering pattern informing of the fact that transmission shall start. The empty space sent out by the master nodes will not have the same length. Therefore the idle pattern added by the superior master node has to be long enough for allowing all master nodes to end their transmissions in time for receiving the triggering pattern.

In FIG. 2 the frames from one superior master node and two respective master nodes 1 and 2, as an example, are compared with each other. As can be seen the length of the idle pattern TOM1 added by the superior master node is between the empty spaces TOM2 and TOM3, respectively, of the two master nodes. The empty space TOM2 of the master node 1 is the longest one since it sends fastest, whereas the empty space TOM3 of the master node 2 is the shortest one since it sends slowest. As an example the time $t_{TOM}$ of the idle pattern added by the superior master node can be put to:

$$t_{TOM} = 2 \times f/f \times T,$$

where f/f = the accuracy of the oscillator

T = 1/frame repetition frequency.

Figure 3:
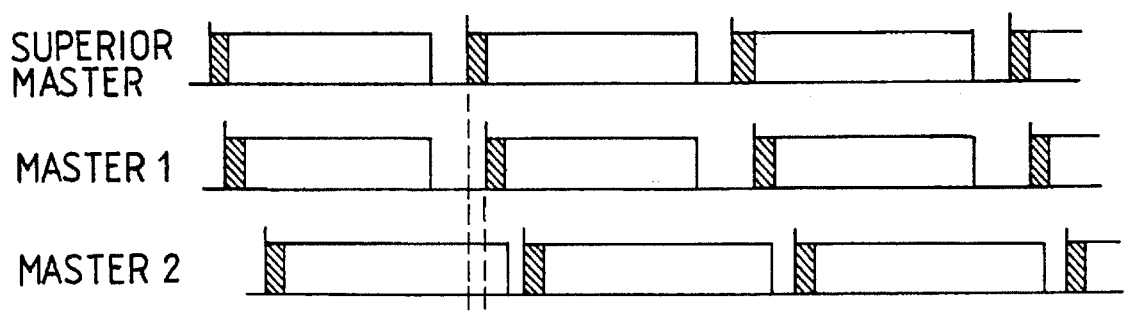

There will be a short propagation delay before the master node begins its transmission but this delay will be constant throughout the network and does not affect the synchronization. In FIG. 3 an example of propagation delay of the masters according to FIG. 2 is illustrated.

The method according to the invention can be applied in the MAC-protocol PTM (L. Gauffin, L. Håkansson, B. Pehrson, Multi-Gigabit Networking based on PTM, 1:st MultiG workshop, Stockholm, Nov. 1, 1990). This is a connection orientated high speed protocol for Gigabit-networks. The topology thereof is a double fibre bus, shown schematically in FIG. 4. PTM stands for Programable Time Multiplex.

The band width is divided into time frames with the length T. Each cycle is divided into N time slots and each time slot is used for transmitting a n-bitframe. From the beginning T=125 µs, N=2048, and n=64 bits.

The main property of the MAC-protocol is that a small number of the time slots (called static slots) are used as control channels between the nodes. All other time slots (called dynamic slots) constitute free band width and are dynamically assigned to nodes. From the beginning the dynamic slots are evenly distributed between all nodes although the distribution is different on each one of the buses.

Another important property of the PTM-network is that each node can be connected to 1, 2 or 3 double fibre buses, and that the contents in a time slot on a double bus can be connected over to a time slot on another double bus.

One of the most interesting aspects of this network with many individuals is that the differences between LAN (Local Area Network), MAN (Medium Area Network) & WAN (Wide Area Network) disappears. In future the fibres of the very fast network are supplied by the telecommunication companies as dark fibres with wall adapters, where the own equipment can be connected.

Frame synchronization in the PTM-network is obtained in the following way.

Each node on the same bus is totally synchronized by use of a PLL. For synchronization between different buses an idle pattern according to the above is used in accordance with the invention. At use of the system with idle pattern and PLL no very accurate clock signals are needed in the nodes. Crystals with a tolerance of 200 ppm can be used.

For avoiding cycle slip the length of the idle pattern has to be longer than the difference in cycle time between the slowest and fastest buses of the network. The maximum difference in cycle time is here 2×200 ppm=400 ppm. A cycle time of T=125µ gives an idle time of 50 ns. If this is translated into bits (a bit=0,925 ns) this will give a smallest length of the idle pattern of 54 bits. The total number of data bits in a time frame is approximately 130000. This gives an overhead of less than 1 promille.

The PLL must receive a signal for keeping the clock signal stable. The idle pattern is therefore made as a bit sequence. There is no problem using a bit sequence for illustrating idling since the time slot counter will know when the frame has come to an end.

Two things are required by the triggering pattern before a new frame can be started. Firstly, there must be no doubt that it is the question of a triggering pattern. Secondly, the counter in the node must have indicated the end of the frame before the triggering pattern arrives. The idle pattern must be long enough for guaranteeing that the slowest bus will be able to end its frame.

Figure 4:
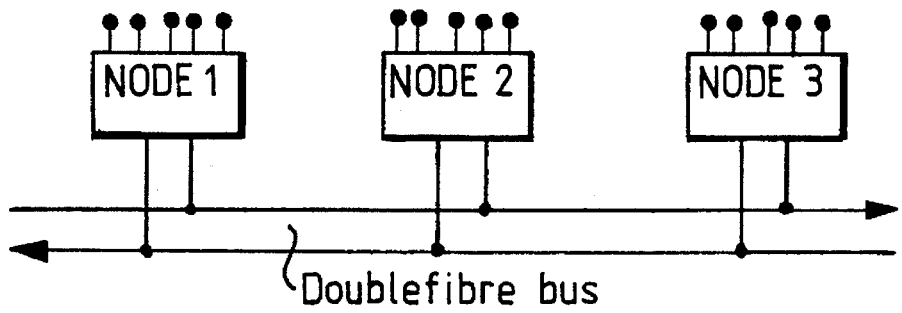
Figure 5:
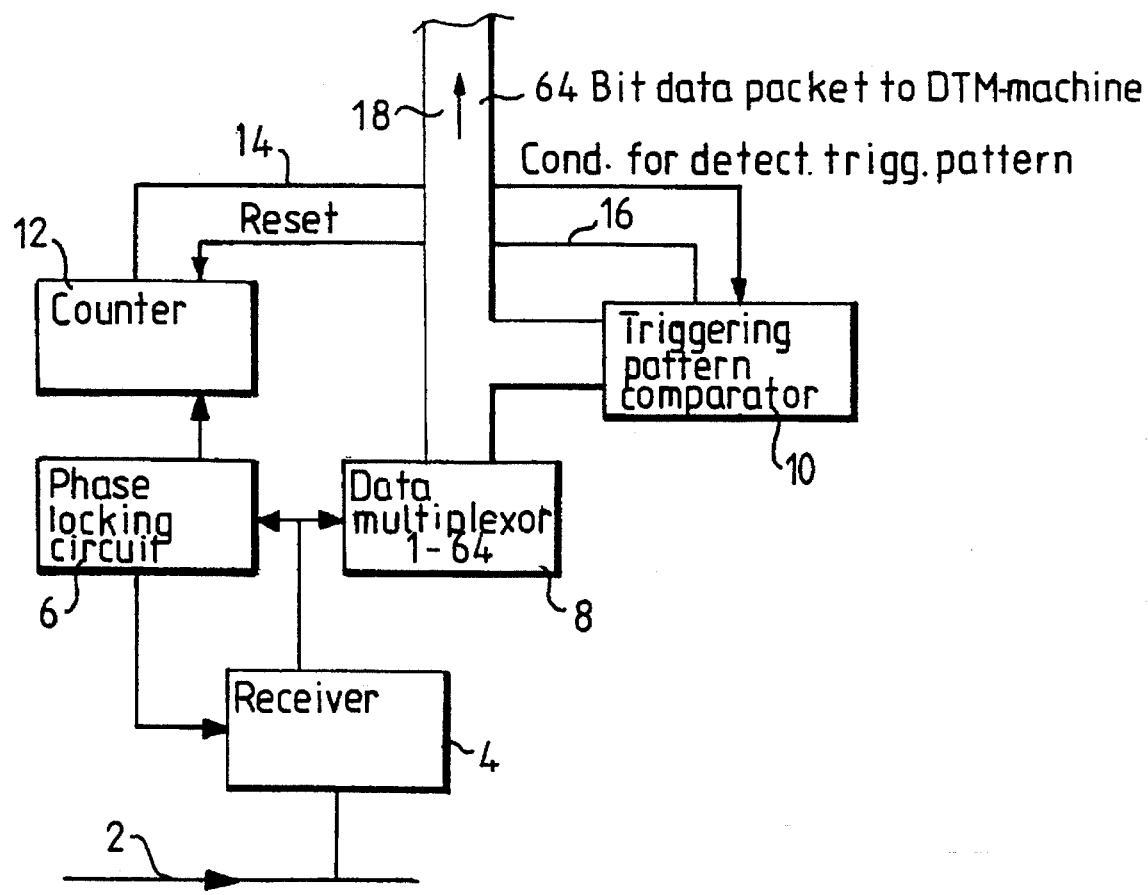
FIG. 5 shows a schematical block diagram of one embodiment of a receiving master node included in the network according to FIG. 4.

FIG. 5 as an example schematically shows the composition of a receiving node in the network according to FIG. 4.

On the incoming fibre designated 2 either data or a clock pattern will appear. In the way described above, received data are divided into time frames, including triggering pattern, data and idle pattern.

Data or the clock pattern is supplied via the receiver 4 of the receiving node to a phase locking circuit 6 locking the PLL of the node to the clock of a master node. The clock of the receiving node will thereby be locked to the master clock at the transmission of data to other nodes in the network.

Data are furthermore received in a data multiplexor 8 which passes on incoming data divided into 16-bit packets to a triggering pattern comparator 10. In the comparator 10 the fixed triggering pattern is stored for comparison with and identification of the triggering pattern of an incoming time frame, said triggering pattern preceded by the idle pattern being included in the first 16 bit packet. A condition for starting detection of the triggering pattern is obtained from a counter 12 which is controlled by the PLL of the node, and the period of which is similar to the cycle time of a time frame minus the length of the idle pattern.

After having finished counting the counter 12 emits the condition to the comparator 10, indicated by an arrow 14, in the form of a signal to start looking for the triggering pattern. As soon as the triggering pattern has been detected, a reset signal is sent from the comparator 10, indicated by an arrow 16, to the counter 12, which starts a new counting cycle. At the same time transmission is started, indicated by an arrow 18, of data in the form of 64 bit packets to a so called DTM-machine (Distributed Time Multiplex), not shown. Principally, this is a switch having control information for connecting data to one or several receiving units, e.g. an interface of a computer, a node located in the same network or in another one, etcetera.

More closer details regarding the above description, as well as design and function of the networks, busses, nodes and blocks, schematically shown in FIGS. 1, 4 and 5, appear as self-evident to the man of the art and need therefore not be described more closely here.

We claim:

1. A method for synchronizing two or more individual communication networks of the time multiplex type, in order to form a composite network thereof, said individual communication networks having nodes via which cyclic transmission of time frames is performed, said time frames including a plurality of time slots intended for data transmission, by determining a frame transmission rate of the composite communication network, said method including the steps of:

forming a fixed idle pattern, common to the composite network, for obtaining synchronization between the individual communication networks, and a fixed triggering pattern, assigning one node in the composite network as a superior master node for determining a frame transmission rate of the composite communication network by adding said idle pattern to each time frame sent out from said superior master node, followed by said triggering pattern wherein said triggering pattern indicates a start for transmitting a next time frame, assigning one node in each of said individual networks as master nodes for synchronizing data transmission of this network, and performing in each of said master nodes the further following steps:

storing the fixed triggering pattern for comparison with and for identifying a triggering pattern of an incoming time frame, forming a condition for starting detection of an incoming triggering pattern, starting detection of an incoming triggering pattern at appearance of said condition, and starting, when an incoming triggering pattern has been detected, transmission of a new time frame from the master node.

2. A method according to claim 1, wherein a length of the idle pattern is substantially greater than a length of the difference between cycle times of the fastest and slowest communication networks.

3. A method according to claim 1, wherein said addition of the fixed idle pattern and the forming of said condition is controlled by means of a counter, the cycling time of which is similar to the cycling time of a time frame minus the length of the idle pattern.

4. An arrangement for synchronizing two or more individual communication networks of the time multiplex type, for forming a composite network thereof, said individual networks having nodes via which cyclic transmission of time frames is performed, said time frames including a plurality of time slots intended for data transmission, comprising:

one node of the composite network being assigned as a superior master node, for determining a frame transmission rate of the composite communication network, which includes means for forming a fixed idle pattern, common to the composite network, for obtaining synchronization between the individual communication networks, and a fixed triggering pattern, and means for adding said idle pattern to each time frame transmitted from said superior master node, followed by said fixed triggering pattern wherein said fixed triggering pattern indicates a start of a next time frame, one node of each of said individual networks being assigned as a master node for synchronizing the data transmission of the respective network, said master node including means for starting, at the receipt of the triggering pattern therein, transmission of a new time frame from the master node, wherein said means for starting transmission of a new time frame from a master node includes:

a counter, a cycling time of which is similar to a cycling time of a time frame minus the length of the idle pattern, and a triggering pattern comparator having means for storing the fixed triggering pattern and for comparing it with and identifying a triggering pattern of an incoming time frame, said counter being connected to the comparator for transmitting, after having finished a count, a signal to the comparator to begin detection of an incoming triggering pattern.

* * * * *

UNITED STATES PATENT AND TRADEMARK OFFICE
CERTIFICATE OF CORRECTION

PATENT NO.    :  5,517,499
DATED         :  May 14, 1996
INVENTOR(S)   :  Lars GAUFFIN et al.

It is certified that error appears in the above-indentified patent and that said Letters Patent is hereby corrected as shown below:

ON THE TITLE PAGE:
In item "[75] Inventors" should read as follows:

--Lars GAUFFIN, Ronninge; Christer BOHM, Stockholm;
  Lars HAKANSSON, Taby; Per LINDGREN, Stockholm, all
  of Sweden--

The following should be inserted on page 1 regarding the foreign priority data:

--Foreign Priority Data:  Swedish Patent Application
  No. 9101635-2, Filed May 29, 1991--

Signed and Sealed this

Eighth Day of July, 1997

*Attest:*

BRUCE LEHMAN

*Attesting Officer*          *Commissioner of Patents and Trademarks*